Figure 3:
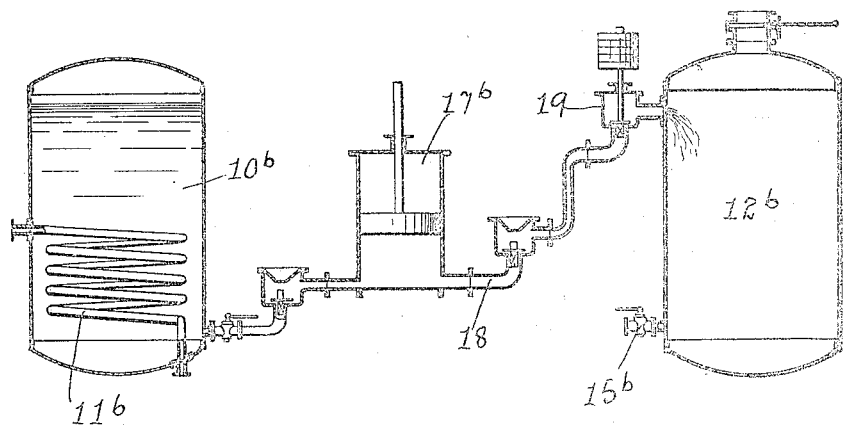

K. SCHREMPP.
METHOD OF SOFTENING WATER.
APPLICATION FILED FEB. 7, 1914.
1,139,378.
Patented May 11, 1915.
2 SHEETS—SHEET 1.
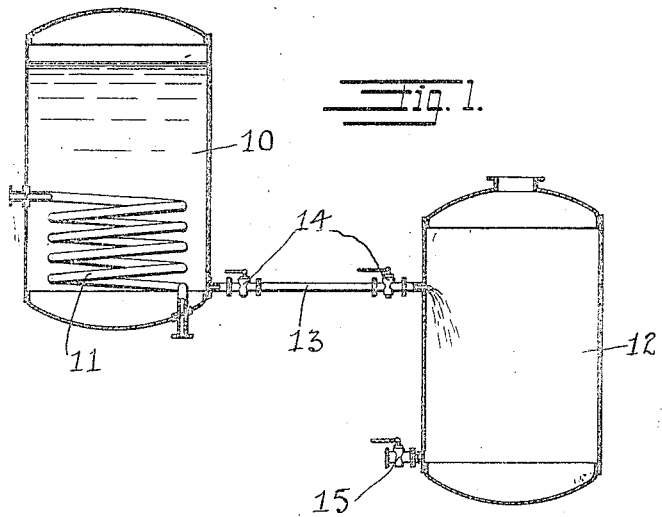
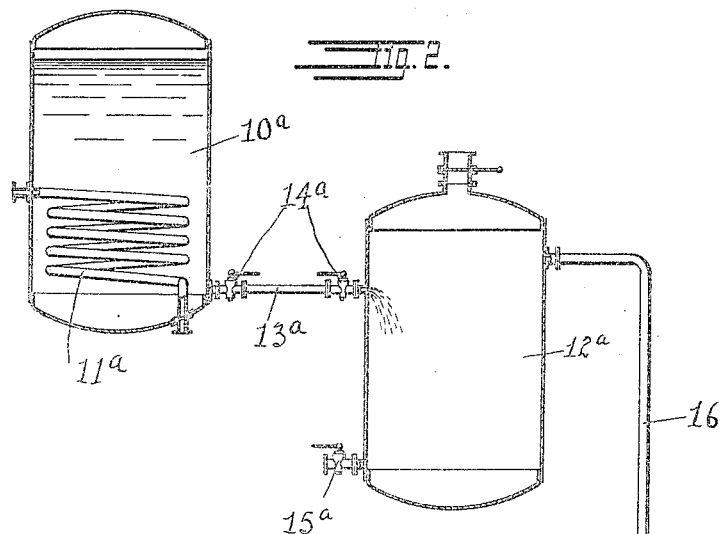
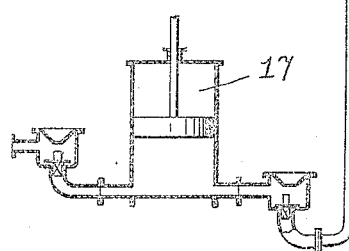
Witnesses:
Inventor:
Karl Schrempp
by his Attorney

K. SCHREMPP.
METHOD OF SOFTENING WATER.
APPLICATION FILED FEB. 7, 1914.

1,139,378.

Patented May 11, 1915.
2 SHEETS—SHEET 2.

UNITED STATES PATENT OFFICE.

KARL SCHREMPP, OF KARLSRUHE, GERMANY.

METHOD OF SOFTENING WATER.

1,139,378.

Specification of Letters Patent.  Patented May 11, 1915.

Application filed February 7, 1914. Serial No. 817,137.

*To all whom it may concern:*

Be it known that I, KARL SCHREMPP, residing at Karlsruhe, in the Grand Duchy of Baden and Empire of Germany, have invented certain new and useful Improvements in Methods of Softening Water, of which the following is a specification.

This invention relates to a process for totally or partially removing the hardness of water, resulting from the content of carbonates. As is known a distinction is made between such substances which give the water a temporary hardness and such that give it a permanent one. The temporary hardness is produced chiefly by the bicarbonates of lime and of magnesia, and such hardness is frequently termed carbonate hardness.

The present method dispenses with the addition of chemicals to the water, the formation of the insoluble carbonates, *i. e.* the softening of the water, being effected in quite a different manner.

I have found that if water containing the soluble bicarbonates is kept heated for some time at a temperature above the boiling point, and then a sudden relief of pressure is effected, the dissolved bicarbonates become decomposed and the carbonates separate forming a compact precipitate. An important feature of this novel method resides obviously in the difference of pressure effected by the sudden relief of pressure, and, in fact, experience has shown that the higher that difference of pressure, or that fall of pressure, is, the more perfect is the softening of the water. Various ways may be chosen to produce this difference of pressure.

The water may, as already mentioned, be heated to a temperature above the boiling point, *i. e.* it may be subjected to a pressure corresponding to the high temperature applied, and may then be made to pass as quickly as possible into another receptacle, where there is atmospheric pressure only, whereby the corresponding considerable fall of pressure entails the precipitation of the insoluble carbonates in a state permitting of their easy separation by filtration. Or the water is heated to a temperature below the boiling point and the difference of pressure is produced by quickly conducting the thus treated water into a receptacle where there is an appropriate partial vacuum. Or the water is heated to any predetermined temperature, and a pressure which is higher than that corresponding to the temperature of that water is exerted upon the water by any mechanical means, the relief of the pressure, or an appropriately lower pressure, being then produced by suddenly removing that higher pressure from the water. In a similar manner the water to be softened may be put under a pressure, say of two atmospheres; then the pressure is raised, may be by exterior heating and after this the appropriate relief of pressure is produced in any desired and known manner, the result being the liberation and the escape of the carbonic acid, which was previously fixed as bicarbonate. I have also found that the higher the temporary hardness of the water is, and the greater the contents of fixed carbonic acid, the greater must be the difference of pressure produced by the sudden relief of pressure, which is, in many cases, equivalent to a correspondingly higher heating of the water to be treated. Experiments have further shown that, at a low pressure and a low temperature, bicarbonate of lime may be more completely decomposed than the bicarbonate of magnesia. If, thus, a water to be softened has, proportionately, a greater content of said latter bicarbonate, the softening must be effected at a correspondingly higher temperature and higher pressure. The suitable treatment of the water thus depends in some cases upon the nature and the character of the temporary hardness.

In the accompanying drawings I have shown several forms of apparatus by means of which my invention may be practised.

Figure 4:
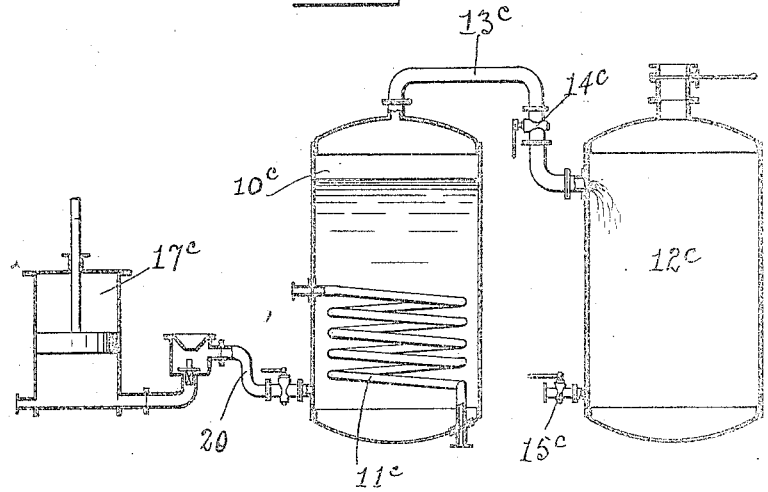

Figure 1 is a schematic view partly in section of an apparatus wherein the water is heated above the boiling point and is then passed into a vessel under atmospheric pressure. Fig. 2 is a similar view of an apparatus wherein the water is heated in one vessel to a temperature below boiling point and is then passed into a vessel wherein a partial vacuum prevails. Fig. 3 is a similar view of an apparatus wherein the water is heated in one vessel to any desired temperature, pressure is applied thereto, and the water is then passed into a vessel wherein atmospheric pressure prevails; and Fig. 4 is a similar view of an apparatus wherein the water is preliminarily compressed, heated, and then passed into a vessel wherein atmospheric pressure prevails.

Referring to the form of invention shown in Fig. 1, the numeral 10 denotes a heating vessel containing the worm 11 by means of which the water may be heated to a temperature above the boiling point. 12 denotes a vessel open to atmosphere and connected by the pipe 13 with the vessel 10. The pipe 13 is provided with the controlling valves 14, and the vessel 12 is provided with the draw-off cock 15. In this form of invention the water in vessel 10 is heated to a temperature above the boiling point, and then by opening the valves 14 the water is permitted to suddenly rush into the vessel 12 so that the pressure which acted upon the water in vessel 10 is suddenly relieved when the water reaches the vessel 12.

In Fig. 2, $10^a$ denotes the heating vessel provided with the heating worm $11^a$, and $12^a$ denotes the chamber into which the water flows from the vessel $10^a$ through the pipe $13^a$ which is controlled by the valves $14^a$. 16 is a pipe leading from the vessel $12^a$ to a pump 17 adapted to produce a partial vacuum in the vessel $12^a$. The water in vessel $10^a$ is heated to a temperature below the boiling point, and after a sufficient vacuum has been created in the vessel $12^a$ by the pump 17, the valves $14^a$ are opened to permit the sudden flow of water from $10^a$ to $12^a$, thereby providing for the pressure differential above referred to.

Referring to the construction of Fig. 3, $10^b$ denotes the heating vessel provided with the heating worm $11^b$. 18 denotes a pipe connection between the vessel $10^b$ and the vessel $12^b$, a pressure pump $17^b$ being interposed in this pipe connection. A throttle valve 19 is also interposed in the pipe connection. The water in the vessel $10^b$ is heated to any desired predetermined temperature, say 150° C. When the water has reached this temperature it is permitted to pass out of the vessel $10^b$, and in the course of its passage through the pipe 18 it is subjected to the action of the pump $17^b$ and placed under a pressure greater than that prevailing in $10^b$. When the water reaches the vessel $12^b$, which is in communication with atmosphere, the pressure is at once relieved. Assuming that the water is under a pressure of 4 atmospheres in the vessel $10^b$, and that the pump $17^b$ further compresses the water to 10 atmospheres, it will be obvious that when the water passes through the throttle valve 19 into the vessel $12^b$ there will be a very substantial relief of pressure.

In the construction of Fig. 4, $17^c$ is a pump connected by a pipe 20 to the heating vessel $10^c$, the latter being connected to the vessel $12^c$ by the pipe $13^c$ controlled by the valve $14^c$. Within the pipe $10^c$ is the heating coil $11^c$. In this form of the invention the operation is as follows:—Before the water enters the vessel $10^c$ it is compressed by the pump $17^c$ to, say, 4 atmospheres. The water then passes into the vessel $10^c$ and is there heated to a temperature which is lower than that which would correspond to a pressure of 4 atmospheres, in order that the water may not boil. From the vessel $10^c$ the water is permitted to pass through the pipe $13^c$ into the vessel $12^c$ which is open to atmosphere, and in this manner the sudden pressure differential is secured.

It will be noted that in each form of device above referred to, the water is first heated to a predetermined temperature, and is thereafter permitted to pass into a vessel in which the pressure either due entirely to heating or otherwise produced, is suddenly relieved.

Having now described my invention, I declare that what I claim is:

The herein described method of softening water which consists in subjecting the water to pressure by heating the same in a chamber, and thereafter suddenly relieving the pressure on the water by passing the latter into a chamber wherein the pressure is considerably lower than in the first mentioned chamber, whereby insoluble carbonates are precipitated in said second chamber.

In testimony whereof I affix my signature in presence of two witnesses.

KARL SCHREMPP.

Witnesses:
 HEINRICH LIMPFWIN,
 S. S. BERGER.